United States Patent [19]
Geisthoff

[11] Patent Number: 5,267,904
[45] Date of Patent: Dec. 7, 1993

[54] HOOKS UNIVERSAL JOINT HAVING SUPPORTING MEMBER

[75] Inventor: Hubert Geisthoff, Lohmar, Fed. Rep. of Germany

[73] Assignee: Jean Walterscheid GmbH, Lohmar, Fed. Rep. of Germany

[21] Appl. No.: 774,792

[22] Filed: Oct. 10, 1991

[30] Foreign Application Priority Data

Oct. 11, 1990 [DE] Fed. Rep. of Germany ....... 4032252

[51] Int. Cl.⁵ .......................... F16D 3/26; F16C 1/24
[52] U.S. Cl. ...................................... 464/136; 464/11; 464/133
[58] Field of Search ................. 464/11, 12-14, 464/125, 132, 133, 136, 147

[56] References Cited

U.S. PATENT DOCUMENTS

| 1,324,480 | 12/1919 | Thiemer . | |
| 1,673,925 | 6/1928 | Swenson | 464/12 |
| 2,259,338 | 10/1941 | Frank . | |
| 3,178,908 | 4/1965 | Stillwagon, Jr. | 464/136 X |
| 3,300,258 | 1/1967 | Kompanok, Jr. et al. | 464/136 X |
| 3,304,744 | 2/1967 | Folley | 464/125 |
| 3,782,797 | 1/1974 | Lange et al. | 464/132 X |
| 3,878,695 | 4/1975 | Pitner | 464/136 X |
| 4,103,512 | 8/1978 | McElwain et al. | 464/14 |

FOREIGN PATENT DOCUMENTS

| 0157565 | 11/1988 | European Pat. Off. . |
| 7107471 | 8/1971 | Fed. Rep. of Germany . |
| 2809665 | 9/1979 | Fed. Rep. of Germany . |
| 3017314 | 10/1983 | Fed. Rep. of Germany . |
| 354139 | 9/1905 | France . |
| 787785 | 12/1957 | United Kingdom . |

Primary Examiner—Daniel P. Stodola
Assistant Examiner—William G. Battista, Jr.
Attorney, Agent, or Firm—Harness, Dickey & Pierce

[57] ABSTRACT

A universal joint (1) has two joint yokes (2 and 3) each including two yoke arms (4 and 5). A supporting member (8) including legs (9 and 10) is arranged to extend transversely relative to the rotational axis (D) of the joint yokes (2, 3). The connection of the two joint yokes (2 and 3) is effected through yoke arm through-bores (6 and 7) and the support member bores (11 and 12) via a bearing pin (13).

10 Claims, 6 Drawing Sheets

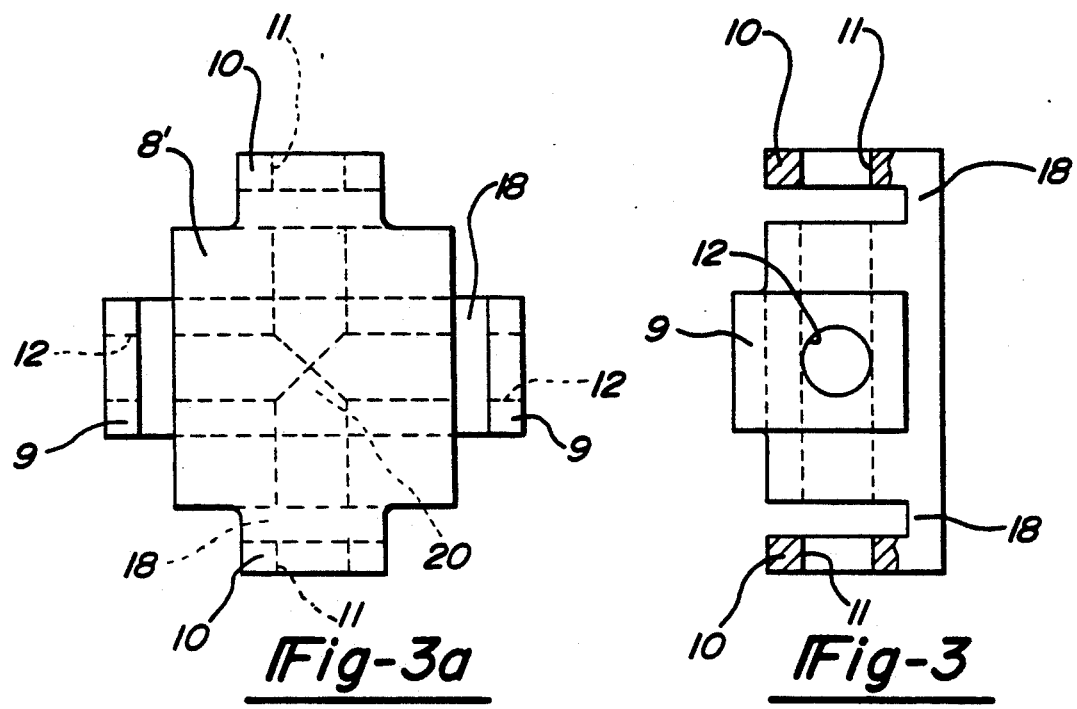
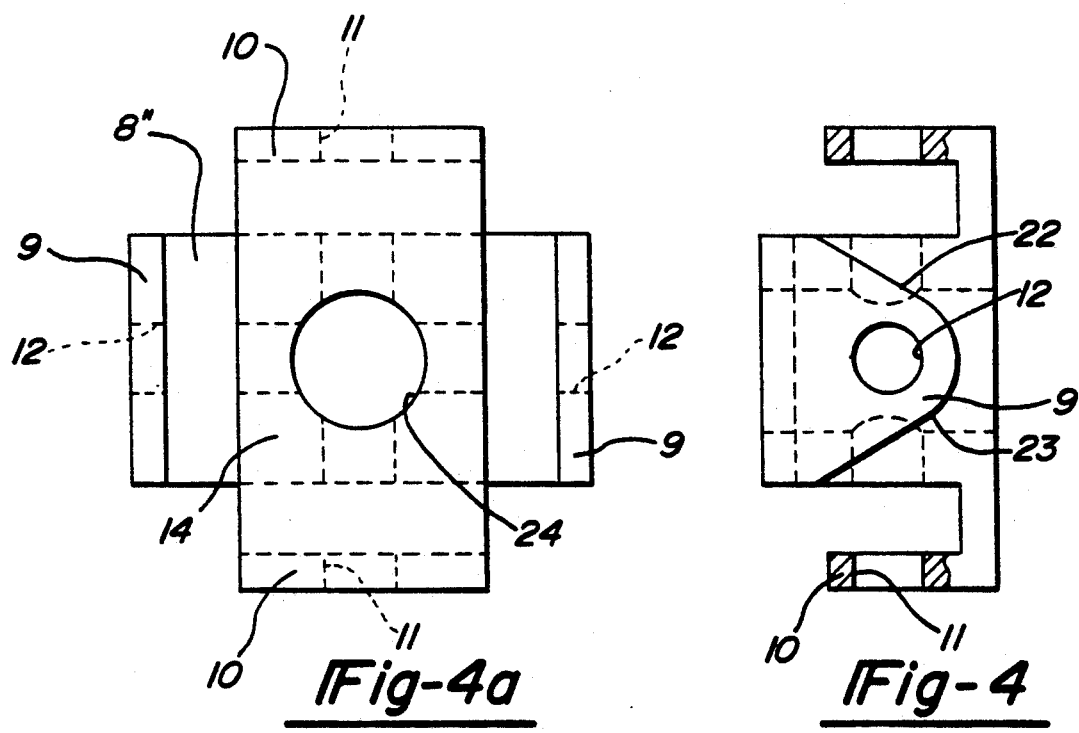

HOOKS UNIVERSAL JOINT HAVING SUPPORTING MEMBER

BACKGROUND AND SUMMARY OF THE INVENTION

The invention relates to a Hookes universal joint. The joint has two joint yokes each with two yoke arms which extend from a hub. Through-bores on each arm are arranged transversely relative to the rotational axis of the joint yokes. A supporting member with radial outer and inner portions with bores corresponding to the through-bores accommodates the yoke arms. Bearing pins are passed through the yoke arm bores and the associated supporting member bores.

German Patent No. 2,809,665 discloses a Hookes universal joint with a supporting member in the form of a ring. The ring includes four axial, circumferentially distributed apertures, with radial bores passing therethrough. The ends of the yoke arms are inserted into the apertures and secured in the rings by pins. The pins pass through bores in the supporting member and in the yoke arms. The disadvantage of this design is that the annular shape with the apertures limits the possible angle of articulation.

Another Hookes universal joint having a bearing with a single-shear connection is illustrated in German Patent DE 30 17 314 C2. The joint includes a supporting member with plate-shaped legs. The disadvantage of this design is a low torque transmitting capacity because the support with a single-shear connection may lead to edge pressure in the region of the bearings. In order to increase the torque transmitting capacity, dimensional increases are essential. Furthermore, the use of friction bearings is restricted.

It is the object of the invention to provide a Hookes universal joint which, in spite of its simple design and being made of plate metal parts for example, is capable of transmitting a higher torque than prior Hookes universal joints, without requiring any extra space.

In accordance with the invention, the objective is achieved by providing a support member positioned radially between and arranged opposite the free ends of the yoke arms. The support member has a central member with at least one radial web connecting the radially outer legs which, with an extended joint, extend parallel to the rotational axis of the joint.

The advantage of such a design is a double-shear connection. The torque transmitting capacity, as compared to prior art joints, can be increased without providing any extra space, while nevertheless achieving a larger articulation angle. Furthermore, the edge pressure is avoided, advantageously, affecting the bearing conditions. Such a measure also permits the use of friction bearings. In addition, the joint may be produced in a cost-effective way by using stamped plate-metal parts. A particularly advantageous range of application for such Hooks universal joints refers to driveshafts for driving agricultural machinery.

A particularly advantageous method of producing the supporting member is achieved if the supporting member consists of two identical supporting member parts. Each part includes a central portion, two diametrically opposed first inner legs, coupling with the yoke arms of one joint yoke and, so as to be rectangularly circumferentially offset thereto, two diametrically opposed second outer legs coupling with the yoke arms of the other joint yoke. If the two supporting member parts are assembled so as to be circumferentially offset relative to each other and point in opposite directions, the legs of each are connected to the central portion via a web.

The two supporting member parts may be formed from plate-metal and connected to each other so as to achieve a form-fitting or material-locking connection. Alternatively, it is proposed that the central portion of the supporting member should be designed to be solid, with the webs and outer legs being formed onto said central portion.

According to a further embodiment of the invention, a bearing bushing is inserted between the yoke arm bore and the bearing pin. The one end face of the bearing bushing may be supported on the inner face of the support member radially outer leg and the other end face on the outer face of the support member radial inner leg. The bearing bushings preferably contain a needle bearing.

Such a design is suitable for centering the joint yokes relative to each other via the bearing bushings. By suitably dimensioning the distances and selecting the bearing bushings in different lengths, it is possible to provide easy assembly conditions.

According to a further embodiment of the invention, it is proposed that between the two supporting member parts there should be formed a cavity for accommodating a central member. The central member is provided with bores corresponding to the yoke arm through-bores to receive the bearing pins. Also, the central member includes transverse bores for introducing pegs to lock the bearing pin in the central member. The transverse bores intersect the bearing pin bores tangentially in the region of the pin grooves which are engaged by the pegs.

The central member accommodates and centers the yoke arm bearing pins. The bearing pins are locked by pegs which are inserted into transverse bores to engage the pin grooves while permitting easy assembly and dismantling conditions.

The bearing pins are lubricated by grease which, via lubricating fittings, is pressed into a grease chamber formed by a cavity in the central member. The cavity is open towards the bores of the bearing pins.

In a further embodiment of the invention, between the two supporting member parts, a cavity is formed constituting a grease chamber. The cavity is formed by a resilient and corresponding part. The central portion of the supporting member includes central bores to center the formed parts in the central portion.

The two formed parts are arranged in the cavity of the central portion. The two formed parts form a cavity which is also intended to be used as a grease chamber for lubricating the joint. The first formed part is a truncated one which is closed at the upper tapered end. The cone includes a centrally centered outwardly directed bead. The outer face of the truncated cone includes at least one bore to enable the grease to pass from the grease chamber to the bearings. The second formed part consists of a square central face with four arms arranged to extend crosswise. Each arm is formed so as to be articulated twice and whose outer faces extend rectangularly relative to the rotational axis. The head face of the arms is provided with a groove enclosing the bearing pin at least partially in a form-fitting way. The central face also comprises a bead which is arranged centrally in the direction opposite to the articulated arms.

The bead of the first and second formed part serves to center and hold the two formed parts in the two opposed supporting member parts which, for this purpose, are provided with a bore. The bearing pins in the joint yokes are secured by the grooves in the head faces of the arms of the second formed part which is held in position by the first formed part. This ensures easy assembly conditions for the Hookes universal joint. Dismantling is facilitated by exerting pressure on the first or second formed part through the central aperture in the supporting member by an auxiliary tool such as a nail or screw driver.

From the following detailed description taken in conjunction with the accompanying drawings and subjoined claims, other objects and advantages of the present invention will become apparent to those skilled in the art.

DETAILED DESCRIPTION OF THE DRAWINGS

FIG. 3 is a side elevation view of a single-part embodiment of the supporting member.

FIG. 3a is a front elevation view of FIG. 3.

FIG. 4 is a side elevation view of a further embodiment of a single-part supporting member.

FIG. 4a is a front elevation view of FIG. 4.

FIG. 11 is a sectional view along line 11—11 of FIG. 11a.

DETAILED DESCRIPTION OF THE PREFERRED EMBODIMENTS

Figure 1:
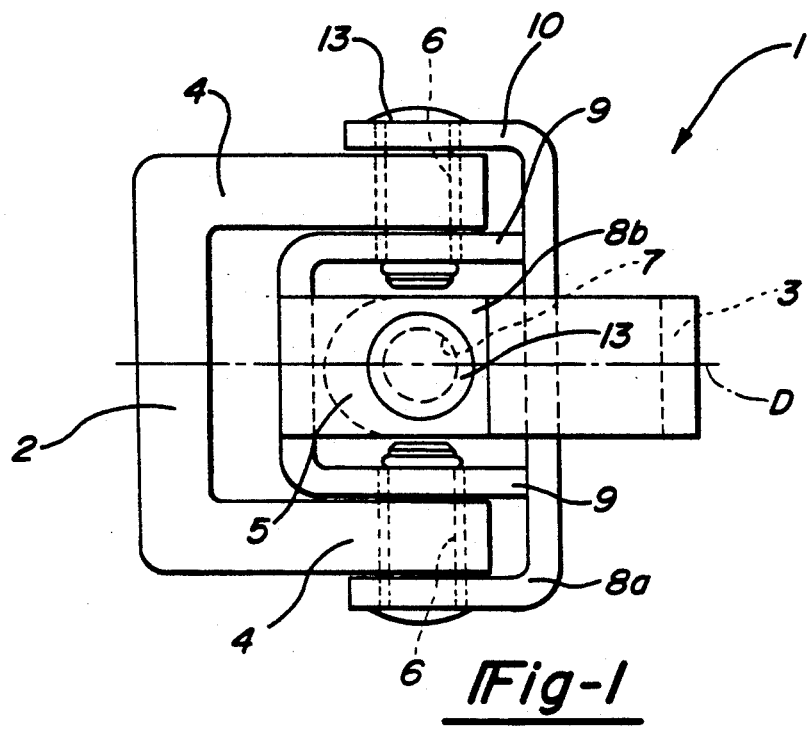
FIG. 1 is an elevation side view of a Hookes universal joint in accordance with the present invention.

FIG. 1 shows a side elevation view of a Hookes universal joint 1 in an extended position. The Hookes universal joint 1 includes two U-shaped joint yokes 2 and 3. Each yoke 2 and 3 has two yoke arms 4 and 5 which extend from a hub. The yokes 2 and 3 are arranged around the rotational axis D so as to be offset relative to each other by 90°. The yoke arms 4 and 5 of the joint yokes 2 and 3 include through-bores 6 and 7 arranged transversely relative to the rotational axis D. Two circumferentially offset supporting member parts 8a and 8b are provided between the joint yokes 2 and 3. The parts 8a and 8b point in opposite directions and include plate-shaped legs 9 and 10 circumferentially offset relative to each other by 90°. The legs 9 and 10 include bores 11 and 12 corresponding to the yoke arm through-bores 6, 7. The supporting member parts 8a and 8b form the supporting member 8 and are accommodated between the yoke arms 4 and 5. The joint yokes 2 and 3 are connected to each other so as to be articulated by bearing pins 13 passing through the bores 11 and 12 and the through-bores 6 and 7. The bearing pins 13 may be secured by pegs as illustrated in, and described in connection with, FIGS. 7 through 9.

Figure 2A:
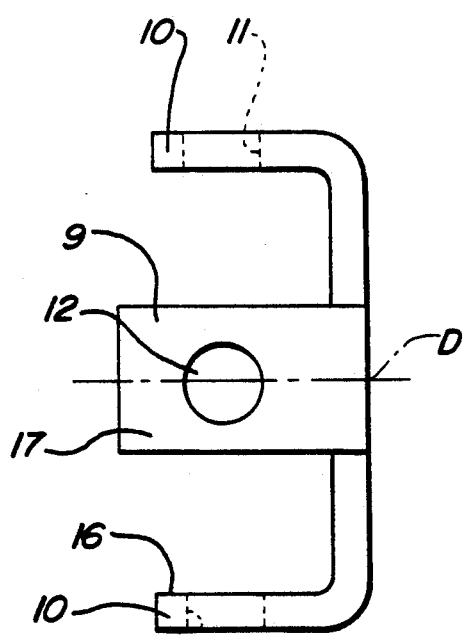
FIG. 2a is a side elevation view of FIG. 2.
Figure 2:
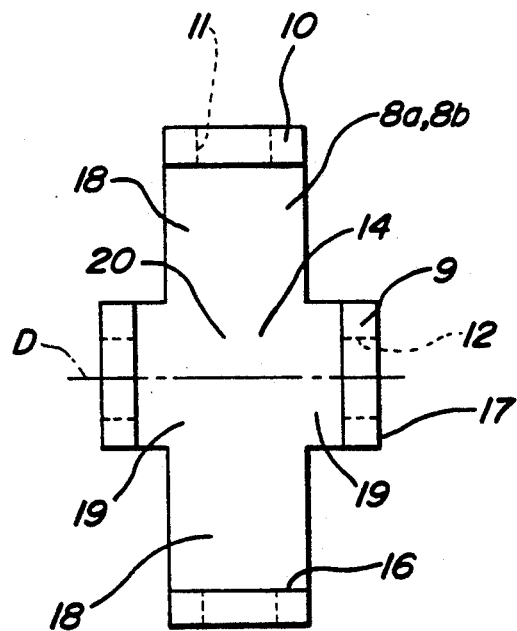
FIG. 2 is a front elevation view of a supporting member in accordance with the present invention.
Figure 5A:
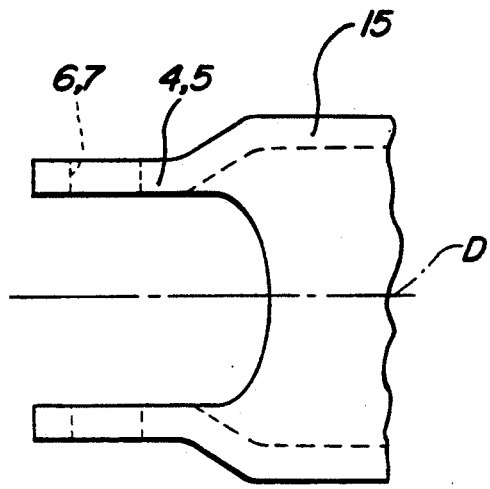
FIG. 5a is a side elevation view of FIG. 5.
Figure 5:
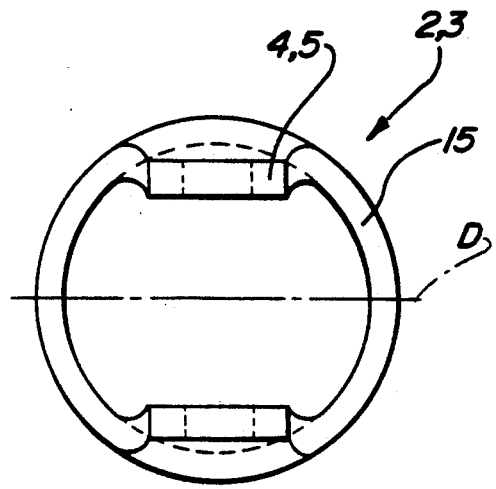
FIG. 5 is an end elevation view of a tubular joint yoke.
Figure 6A:
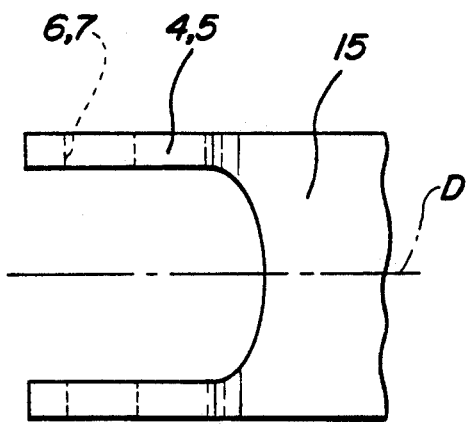
FIG. 6a is a side elevation view of FIG. 6.
Figure 6:
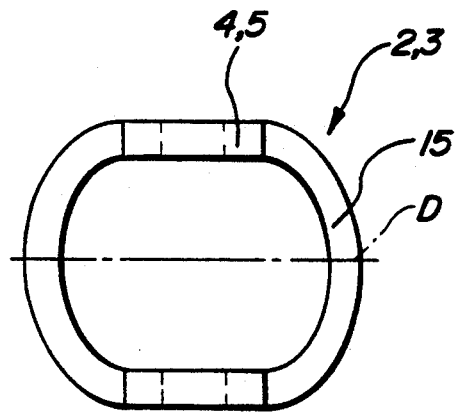
FIG. 6 is an end elevation view of a further tubular joint yokes.

FIGS. 2 and 2a illustrate a supporting member 8 including a central rectangular central portion 14 with two extending diametrically opposed first inner legs 9 to couple the yoke arms 4 of a joint yoke 2, and, so as to be rectangularly arranged and circumferentially offset relative thereto, two extending diametrically opposed second outer legs 10 to couple the yoke arms 5 of the other joint yoke 3. In FIG. 1, two of the supporting members 8a and 8b, pointing in opposite directions, are assembled so as to be circumferentially offset relative to each other by 90°, so that when the Hookes universal joint is in an extended position, the legs 9 and 10 are orientated to extend parallel to the rotational axis D. The legs 9 and 10 include bores 11 and 12 corresponding to the yoke arm through-bores 6 and 7 to receive the bearing pins 13. The bearing pin 13 constitutes the connecting member for the two joint yokes 2 and 3.

The advantage of the double-shear connection of the supporting means with the bearing pin 13 enables an increased torque transmitting capacity, compared to comparable prior art Hooks universal joints, without requiring an increase in space. Any edge pressure is avoided by the invention. Thus, the invention provides advantageous bearing, .conditions and permits the use of friction bearings. The Hookes universal joint 1 may be cost-effectively produced from stamped plate-metal parts. The universal joint is suitable for the drives of agricultural machinery. A particularly advantageous method of producing the supporting member 8 is by using two identical plate-metal supporting member parts 8a and 8b, as already explained, which are connected to each other to form a form-fitting or material-locking connection. The yoke arm through-bores 6 and 7 may be provided with bearing bushings which receive the bearing pin 13. The one end face of the bearing bushing rests against the inner face 16 of the supporting member radially outer leg 10 and the other end face against the outer face 17 of the supporting member radially inner leg 9.

FIGS. 3 and 3a illustrate views of a single-part supporting member 8' including a square central portion 14. The supporting member 8' is symmetrical and includes two pairs of diametrically opposed legs 9 and 10 to couple the yoke arms 4 and 5 of the joint yokes 2 and 3. The legs 9 and 10 are formed on webs 18 and extend from the central portion 20. The legs 9 and 10 include bores 11 and 12 which receive the bearing pins 13.

The supporting members 8' according to FIGS. 3 and 4 are designed to be substantially solid. They comprise a solid central portion 14 having lube passages in central bore 24 with the legs 10 connected via the web 18. The inner legs 9 are formed by the central portion 14 itself. The legs 9 and 10 of the supporting member 8" according to FIG. 4 additionally comprise chamfers 22 with a curvature 23 which permit a higher degree of movability and articulation up to 90° of the Hookes universal joint 1. The central portion 14 of the supporting member 8" includes a bore 24 which permits access to the cavity formed by the two supporting member parts, e.g. the bearing pins 13 may be locked by securing discs or it is possible to press in grease for lubricating the bearing pins 13, possibly via a lubricating nipple. It is also possible to provide the supporting member parts according to FIG. 2 or 3 with chamfers 22.

FIGS. 5 and 5a and 6 and 6a illustrate views of alternate designs of joint yokes 2 and 3. A first design of joint yoke according to FIGS. 5 and 5a includes a round tubular portion 15 with two flattened yoke arms 4 and 5 which are arranged diametrically opposite on the rotational axis D. The arms 4 and 5 are on the tubular portion 15 with the joint yoke portions being articulated twice in the direction of the rotational axis D relative to the tube diameter of the tubular portion 15. The arms 4 and 5 are located at a reduced distance from the rotational axis D. A second design of joint yoke according to FIGS. 6 and 6a include an oval tube portion 15 with the yoke arms 4 and 5 formed in a straight line on to flat side parts of the tubular portion 15. The arms are not located at a reduced distance from the rotational axis D as in FIGS. 5 and 5a. The yoke arms 4 and 5 include through-bores 6 and 7 with receive the bearing pins 13.

Figure 7:
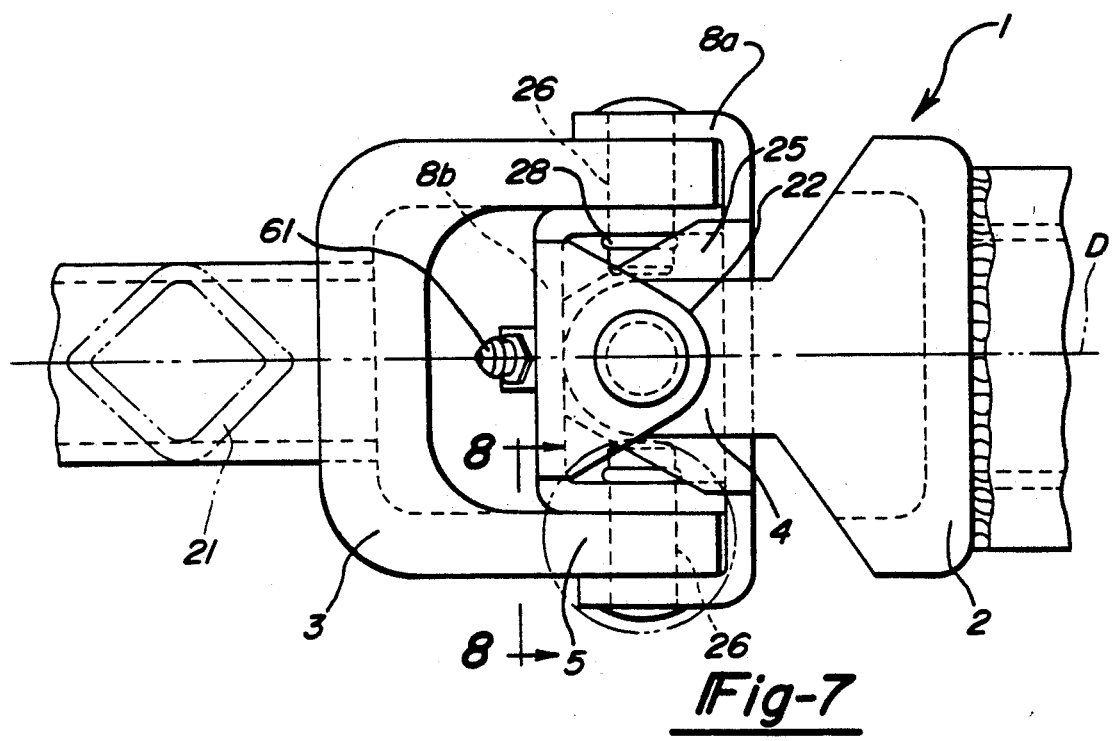
FIG. 7 is a side elevation view of another Hookes universal joint in accordance with the present invention.

FIG. 7 shows a Hookes universal joint 1 with two joint yokes 2 and 3 with yoke arms 4, 5 which are offset by 90° relative to the rotational axis D. A square tube 21, for torque transmitting purposes, is welded to, or formed on so as to be integral with, the joint yokes 2 and 3. A supporting member 8 is received between the joint yokes 2 and 3. The support member 8 includes two supporting member parts 8a and 8b pointing in opposite directions and are circumferentially offset by 90° relative to each other. In this case, the legs 9 and 10 of the supporting member parts 8a and 8b include chamfers 22 to permit the highest possible degree of movability of the Hookes universal joint 1. A central member 25 is received between the supporting member parts 8a and 8b and the joint yokes 2 and 3. The central member 25 enables lubrication of the joint yoke bearing 26. The central member 25 includes a grease chamber and is used to secure the bearing pin 13. Furthermore, the central member 25 is provided with a grease fitting 61 via which the grease chamber may be filled. The joint yoke bearings 26 may be designed as friction bearings, friction bearing bushings or needle sleeves.

Figure 8:
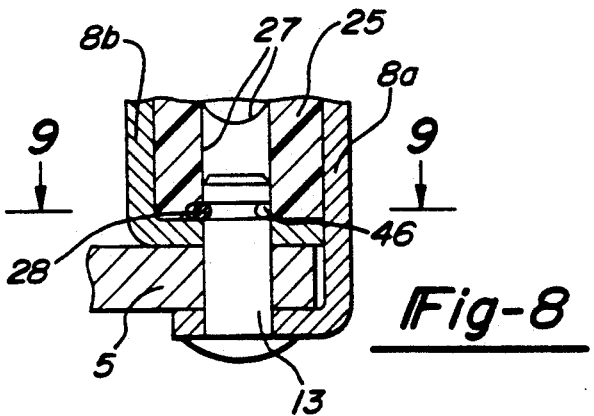
FIG. 8 is an enlarged sectional view along line 8—8 of FIG. 7.
Figure 9:
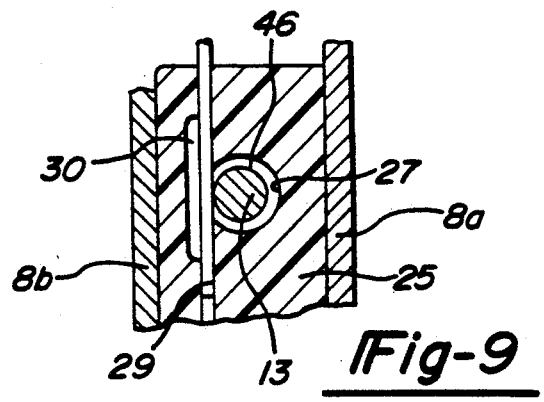
FIG. 9 is a sectional view along line 9—9 of FIG. 8.

FIGS. 8 and 9 show a section through an enlargement according to FIG. 7 illustrating the supporting means for the two part bearing pin 13. FIG. 9 shows a section according to line 9—9 of FIG. 8. The central member 25 includes two central, intersecting bores 27 which receive the bearing pins 13. The bearing pins 13 extend through the bores 11 and 12 of the legs 9 and 10 and through the yoke arm through-bores 6 and 7 into the bore 27 of the central member 25. In the central member, each bearing pin 13 is held by a peg 28 which is received in a transverse bore 29 with a recess 30 and engages groove 46 of the bearing pin 13 The recess 30 allows the peg 28 to be resilient when inserting the bearing pin 13. By locking the bearing pin 13 via the pegs 29 it is easy, at any time, to dismantle the Hooks universal joint 1. The Hookes universal joint 1 is assembled by joining the joint yokes with the supporting parts 8a and 8b and the bearing pin 13, with the bearing pins 13 being locked individually via the inserted pegs 28. The joint is dismantled simply by pulling out the pegs 28.

Figure 10:
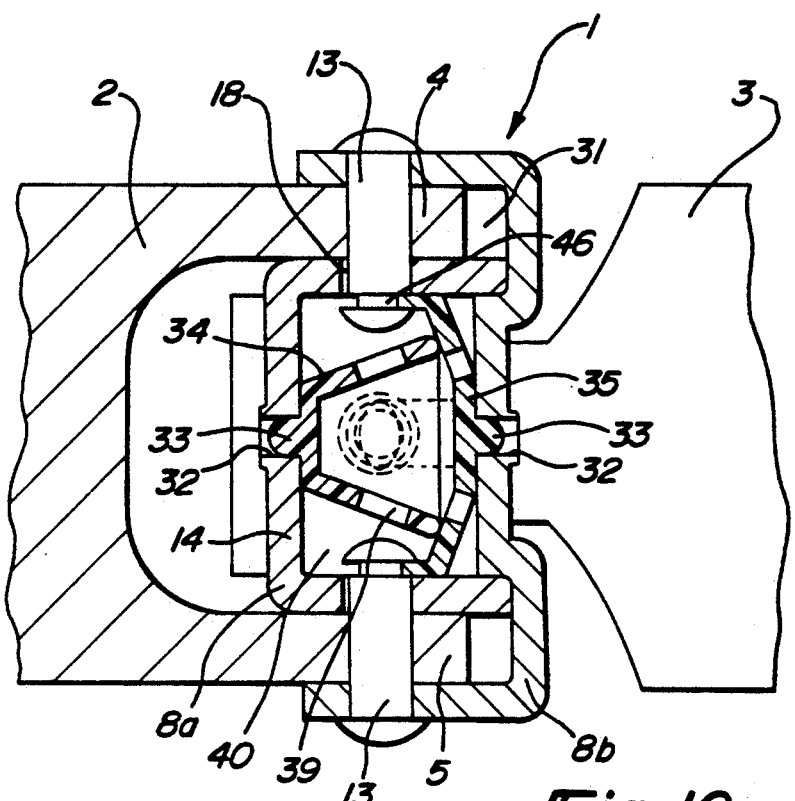
FIG. 10 is a side elevational view of another Hookes universal joint in accordance with the present invention.
Figure 11A:
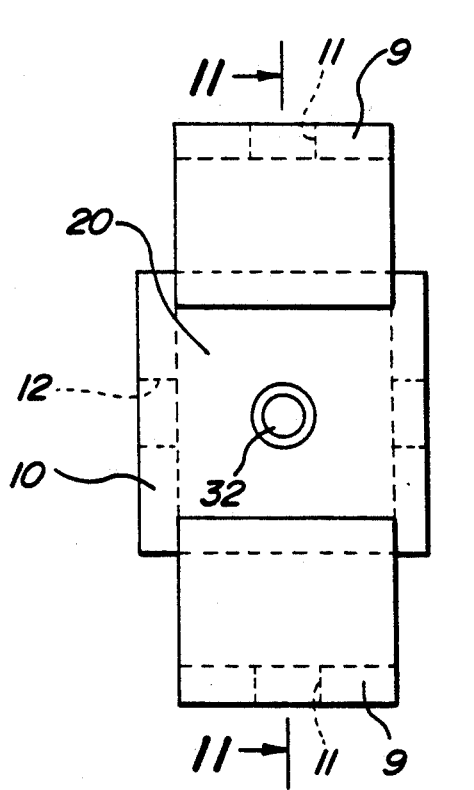
FIG. 11a is an elevational view of a supporting member of FIG. 10.
Figure 11:
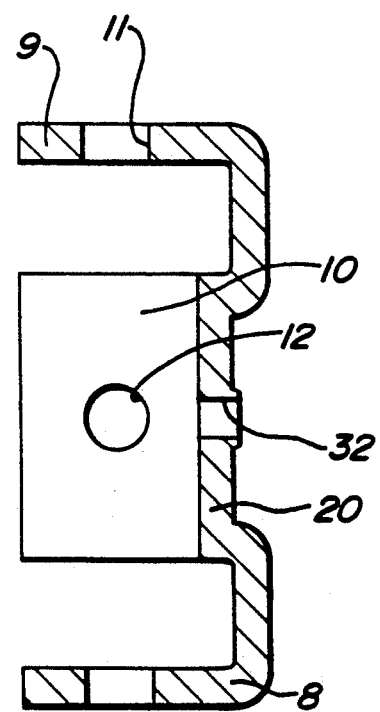
Figure 12:
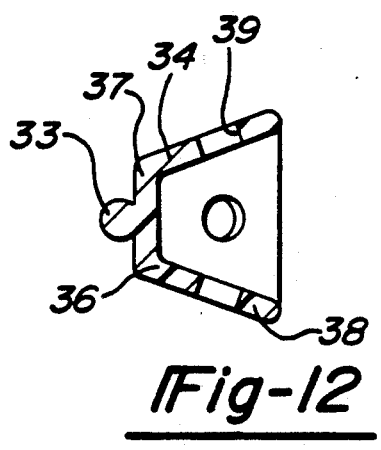
FIG. 12 is a sectional view of a first formed member.
Figure 13:
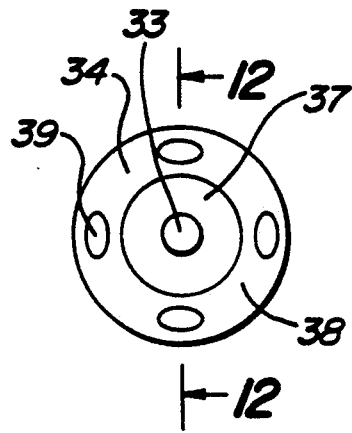
FIG. 13 is a plan view of the first formed member of FIG. 12.
Figure 14:
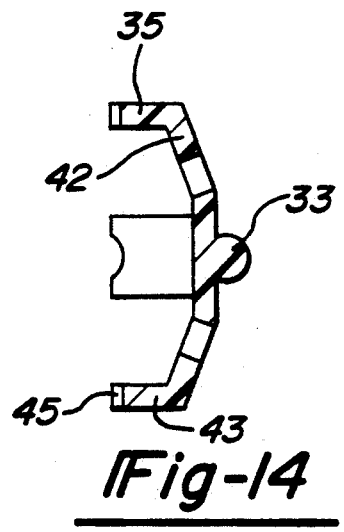
FIG. 14 is a sectional view of a second formed member.
Figure 15:
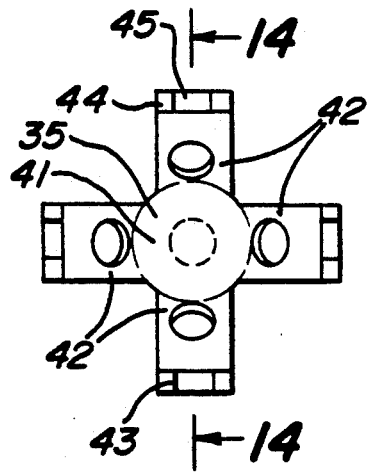
FIG. 15 is a plan view of the second formed member of FIG. 14.

FIG. 10 illustrates another Hookes universal joint 1 with a supporting member 8 including two supporting member parts 8a and 8b according to FIGS. 11 and 11a. The parts 8a and 8b are circumferentially offset by 90° relative to each other and arranged to point in opposite directions. The supporting members parts 8a and 8b each include two legs 9 and 10 with bores 11 and 12 and a square central portion 20.

The central portions 20 are offset inwardly relative to the webs of the legs 9. A step is formed holding the respective other supporting member part with the legs 10, so that the supporting member 8, in the assembled condition, comprises a central portion 14 formed of the two U-shaped portions superimposed crosswise. Because the supporting member parts 8a and 8b are offset by 90° and arranged to face opposite directions, a space 31 is formed between the legs 9 and 10. The space 31 accommodates the yoke arms 4 and 5 of the joint yokes 2 and 3 as seen in FIG. 10. Furthermore, in the center of the central portions 20 there is provided a bore 32 which serves to receive a bead 33. The bead 33 is provided on two resilient formed parts 34 and 35 which are received so as to be centered between the two supporting member parts 8a and 8b and are each held by the bead 33 in the bore 32 of the two supporting member parts 8a and 8b.

The two formed parts 34 and 35 are illustrated in FIGS. 12, 13 and 14, 15. The formed part 34 is a truncated cone 37 whose tapered end 36 is closed. The outer face 38 of the cone includes the outwardly pointing bead 33. The outer face 38 of the truncated cone 37 includes bores 39 allowing the passage of grease from the cavity 40 formed between the two formed parts 34 and 35 to the bearings.

The second formed part 35 include a central face 41 with four arms 42. The arms 42 are arranged crosswise and are each formed on the central face 41 to be articulated twice. The outer faces 43 of arms 42 are parallel to the central axis. The central face 41 of the formed part 35 includes a bead 33 which is arranged in the direction opposite of the articulated arms 42. The head faces 44 of the arms 42 each include a groove 45. The grooves, in the assembled condition of the Hookes universal joint 1, partially embrace and lock the bearing pins 13 so that the bearing pins 13 are secured by the resilient formed part 35 which, in turn, is held in position by the formed part 34. In this way it is possible to provide a simple method of assembling the Hookes universal joint 1. The joint is dismantled by applying pressure to the formed part 34 or 35 through the bore 32 of the supporting member parts 8a or 8b by means of a tool such as a nail or screw driver. The bore 32 may also be used for lubrication purposes by using a grease press, with the formed parts 34 and 35 acting as inlet valves.

While the above detailed description describes the preferred embodiment of the present invention, the invention is susceptible to modification, variation, and alteration without deviating from the scope and fair meaning of the subjoined claims.

I claim:
1. A Hookes universal joint comprising:
two joint yokes each having two yoke arms extending from a hub, each yoke arm including a through-bore arranged transversely relative to the rotational axis of said joint yokes;

a supporting member arranged opposite the free ends of said yoke arms accommodating said yoke arms, said supporting member including two support member parts with outer and inner extending portions, said outer and inner portions including through-bores for associating with said yoke arm through-bores such that the outer extending portions of one part are associated with the inner portions of the other part;

bearing pins passing through said yoke arm bores and said associated support member bores, said supporting member parts including a central portion and at least one web connecting the outer portions.

2. A Hookes universal joint according to claim 1 wherein said supporting member parts are formed of plate metal and connected to each other so as to achieve a form-fitting or material-locking connection.

3. A Hookes universal joint according to claim 1 wherein said supporting member parts have an overall cross shape with said inner and outer legs extending in the same direction.

4. A Hookes universal joint according to claim 1 wherein said central portion of the supporting member is designed to be substantially solid, with said at least one web and said outer legs being formed on to the central portion.

5. A Hookes universal joint according to claim 1 wherein at least one bearing bushing is inserted between each of said yoke arm bores and respective said bearing pins.

6. A Hookes universal joint according to claim 1 wherein a cavity is formed between said two support member parts, a central member is positioned in said cavity, said central member includes bores corresponding to said yoke arm through-bores which receive said bearing pins and said central member includes transverse bores, said central member transverse bores tangentially intersecting said central member bores, and grooves on said pins which are engaged by pegs are located at the intersection of said central bores and transverse bores.

7. A Hookes universal joint according to claim 6 wherein said central member includes a cavity for receiving a lubricant, said cavity is open towards said central member bores for accommodating said bearing pins.

8. A Hookes universal joint according to claim 1, wherein between said two support member parts a cavity is formed constituting a grease chamber, a pair of formed parts are positioned in said grease chamber, and said central portion of said support member parts including central bores for centering said formed parts in said grease chamber.

9. A Hookes universal joint according to claim 8 wherein one of said formed parts is a truncated cone which is closed at the upper tapered end with a centrally centered bead and at least one through-bore in the outer face of the truncated cone.

10. A Hookes universal joint according to claim 9 wherein the other of said formed parts is a square central face with four arms, a head face at the free end of said arms is provided with a groove enclosing said bearing pin at least partially in a form-fitting way and said central face includes a bead.

* * * * *